United States Patent [19]

Grinberg et al.

[11] Patent Number: 4,826,293

[45] Date of Patent: May 2, 1989

[54] ELECTRON BEAM ADDRESSED LIQUID CRYSTAL LIGHT VALVE WITH INPUT SHEET CONDUCTOR

[75] Inventors: Jan Grinberg, Los Angeles; Nubuo J. Koda, Vista; Philip G. Reif, Chatsworth; William P. Bleha, Carlsbad; Murray S. Welkowsky, Chatsworth; Arno G. Ledebuhr, Pleasanton, all of Calif.

[73] Assignee: Hughes Aircraft Company, Los Angeles, Calif.

[21] Appl. No.: 21,381

[22] Filed: Mar. 3, 1987

[51] Int. Cl.[4] .................................................. G02F 1/13
[52] U.S. Cl. .................................... 350/331 R; 350/342
[58] Field of Search ........................... 350/331 R, 342

[56] References Cited

U.S. PATENT DOCUMENTS

| 3,650,608 | 3/1972 | Baker | 350/331 R |
| 4,387,964 | 6/1983 | Arrazola et al. | 350/331 R |
| 4,728,174 | 3/1988 | Grinberg et al. | 350/331 R |

FOREIGN PATENT DOCUMENTS

| 3229083 | 2/1984 | Fed. Rep. of Germany . |
| 2163856 | 7/1973 | France . |
| 2270625 | 12/1975 | France . |

OTHER PUBLICATIONS

Grinberg et al, "Photoactivated Birefringent LCLV for Color Symbology Display", Proceeding of the SID, vol. 16/3, 1975.
Chang, "Electron-Beam Addressable LCD with Storage Capability", IBM Technical Bulletin, vol. 16, No. 1, 1973.
Hansen, "Liquid Crystal Media for Electron Beam Recording", IEEE Transactions on Electron Devices, vol. 15, No. 11, Nov. 1963.
D. Haven et al, "Full-Color Electron-Beam Addressed Light-Valve Projector", SID 1986 Digest, pp. 372–374.
D. A. Haven, "Electron-Beam Addressed Liquid-Crystal Light Valve", IEEE Transactions on Electron Devices, vol. ED-30, No. 5, May 1983, pp. 489–492.
D. A. Haven, "Electron-Beam Addressed Liquid-Crystal Light Valve", 1982, International Display Research Conference, pp. 72–74.

Primary Examiner—Stanley D. Miller
Assistant Examiner—Trong Quang Phan
Attorney, Agent, or Firm—V. D. Duraiswamy; A. W. Karambelas

[57] ABSTRACT

An electron beam addressed liquid crystal light valve (LCLV) produces an AC voltage across a liquid crystal layer from a single polarity electron beam, and exhibits very high resolution. A thin layer of partially conductive material is deposited on a support membrane on the electron beam side of the liquid crystal. A conductive, electron beam permeable sheet is formed on the back of the partially conductive layer. Electrons from the beam are absorbed by the partially conductive layer, and then flow back out to the conductive sheet to produce an AC voltage prior to the next electron beam scan. The conductive sheet is connected in circuit with a transparent electrode which provides a voltage reference on the readout side of the liquid crystal. The device is designed with electrical parameters that produce a discharge rate from the partially conductive layer fast enough to complete an AC cycle between successive electron beam scans, but slow enough for the liquid crystal to respond and produce an image. A separate mirror can be provided to reflect the readout beam back through the liquid crystal, or the conductive sheet can itself serve as a mirror.

29 Claims, 3 Drawing Sheets

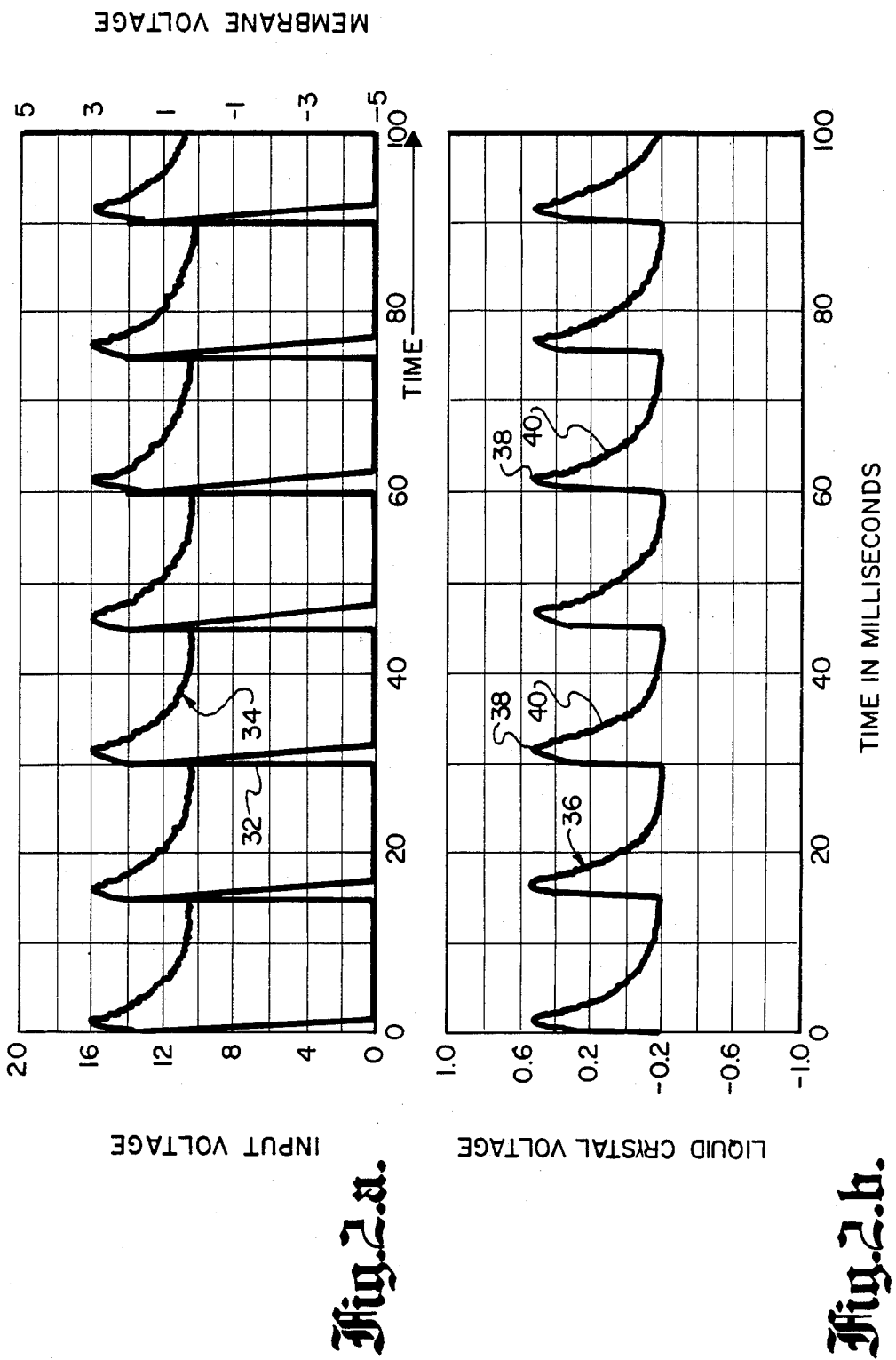

ELECTRON BEAM ADDRESSED LIQUID CRYSTAL LIGHT VALVE WITH INPUT SHEET CONDUCTOR

BACKGROUND OF THE INVENTION

1. Field of the Invention

This invention relates in general to liquid crystal light valves, and in particular to liquid crystal light valves which modulate a readout optical beam in response to an input electron beam pattern.

2. Description of the Related Art

Liquid cystal light valves (LCLVs) generally employ twisted nematic liquid crystal cells in which the liquid crystal molecules are ordered such that plane-polarized light incident on the cell is twisted 45° entering and untwisted 45° after reflection and on exiting. When sufficient voltages are applied to particular areas of the cell, the molecular axes of some of the liquid crystal molecules in these areas orient themselves parallel to the applied electric field. Plane polarized light becomes elliptically polarized in these areas of the cell, while reflected light is unchanged in the areas of the liquid crystal to which no field is applied. An analyser transmits a portion of the elliptically polarized light and reflects the unmodulated plane polarized light. Optical images can thus be produced by the spatial voltage pattern applied to the device.

Past implementations of LCLVs have included devices which are laser-addressed, and devices which are photo-conductor-coupled to a cathode ray tube (CRT) or other light source. Laser-addressed systems, although generally offering high resolution, use generally complex optical systems for both addressing and projection. Photoconductor-coupled devices, in addition to the addressing optics, have used either multilayer construction to isolate the projection and addressing light, or are limited in terms of the wavelength of the addressing/projection light.

An electron/beam addressed LCLV has the potential to eliminate prior problems associated with photoconductors and light blocking layers. In addition, such a device could be made sufficiently fast for real-time operation. A current electron-beam addressed LCLV is a Tektronix Corp. device described in an article by Duane A. Haven, "Electron-Beam Addressed Liquid-Crystal Light Valve", IEEE Transactions on Electron Devices, Vol. ED-30, No. 5, May 1983, pages 489–492. This article describes an LCLV device in which electrons from a writing gun impinge upon a target electrode, and are subsequently erased from the target by means of flood guns. The flood guns recharge the target electrode to a controlled uniform potential. One problem associated with this device is that flood guns are not uniform, and produce a non-uniform distribution of electrons on the target electrode. This in turn produces an image that is not uniform. The Tektronix device requires the use of an expensive transmissive CRT, and its optically transmissive nature limits the choice of materials that can be used in connection with the LCLV. Some materials which might otherwise be suitable are birefringent and can distort light, and therefore are not suitable. It would also be desirable to increase the sensitivity of the device.

A related device is disclosed in a pending U.S. patent application by the present inventors, Ser. No. 927,580, filed Nov, 6, 1986, "Electron Beam Addressed Liquid Crystal Light Valve", assigned to Hughes Aircraft Company, the assignee of the present invention. In the related device the electron beam is directed against a partially conductive layer mounted on an electrically resistive membrane, which in turn electrically communicates with the liquid crystal layer. A conductive matrix, preferably in the form of a metallic grid, is disposed on the electron beam side of the partially conductive layer and divides it into a series of pixels. A voltage of one polarity is induced across the corresponding location of the liquid crystal layer when the electron beam impinges upon a particular pixel in the partially conductive layer. Charge then dissipates from the pixel into the surrounding grid at a rate which is fast enough to substantially discharge the pixel during the interval between electron beam scans, but slow enough to produce an image for a readout optical beam. An appropriate circuit is provided to dissipate the charge from the conductive matrix. The resistances and capacitances of the liquid crystal layer, the membrane and the partially conductive layer are selected to produce a substantially AC voltage across the liquid crystal during the conductive layer discharge following each electron beam scan. The pixels are thus automatically erased without the need for flood guns.

While the light valve of Ser. No. 927,580 represents a substantial improvement over prior devices, presently available manufacturing techniques are not optimum in that the metallic grid is fabricated by means of photolithographic techniques. Photolithography can be difficult, and requires expensive equipment. Also, since the device is designed to operate primarily in a reflective mode, a separate mirror must be provided to reflect a readout beam back through the liquid crystal layer.

SUMMARY OF THE INVENTION

In view of the above problems associated with the prior devices, it is the purpose of the present invention to provide a novel and improved electron beam addressed LCLV which is simple in construction, has a high resolution display, avoids the need for a flood beam and its attendant image distortion, does not require a highly transmissive membrane, and can be fabricated without the use of photolithography techniques.

Another purpose of the invention is the provision of such an electron beam addressed LCLV which is less expensive, and yet more sensitive, than prior devices.

These and other advantages are accomplished in the present invention by an LCLV which is designed to operate primarily in a reflective mode. A flat, electrically resistive membrane is positioned on the electron beam side of the liquid crystal layer, with a layer of partially conductive material supported on the membrane and adapted to be addressed by the electron beam. An accumulation of electric charge at any location in the partially conductive material, due to the impinging electron beam, produces a voltage across a corresponding location in the liquid crystal. The liquid crystal voltage controls its light transmitting characteristic as desired. A thin sheet of conductive material, at least partially permeable to the electron beam, is formed on the partially conductive layer, preferably as an evaporated film. A voltage of one polarity is induced across a corresponding location in the liquid crystal layer in response to the electron beam impinging upon a pixel in the partially conductive layer. Charge then dissipates from the partially conductive into the conductive sheet at a rate which is fast enough to substantially discharge the pixel during the interval between electron beam scans, but slow enough to produce an image for a readout optical beam. A circuit means is connected to dissipate the charge received by the conductive sheet from the partially conductive layer. The resistances and capacitances of the liquid crystal layer, the membrane and the partially conductive layer are selected to produce a substantially AC voltage across the liquid crystal during the discharge following each electron beam scan. The device is thus automatically erased without the need for flood guns.

In the preferred embodiment a mirror may be disposed on the electron beam side of the liquid crystal layer to reflect the readout beam back through the liquid crystal. Alternately, if the membrane is generally transparent and non-birefringent, the conductive sheet may itself function as a mirror for the readout beam. In either case, a transparent electrode is provided on the readout beam side of the liquid crystal, and is connected to provide a voltage reference for the liquid crystal. The conductive sheet and transparent electrode may either be grounded, or connected by means of an AC power supply which improves the liquid crystal sensitivity.

Other features and advantages of the invention will be apparent to those skilled in the art from the following detailed description of preferred embodiments, taken together with the accompanying drawings, in which:

DESCRIPTION OF THE DRAWINGS

FIGS. 2a and 2b are graphs of the input and membrane signals, and the liquid crystal signals for a particular pixel location, respectively;

DETAILED DESCRIPTION OF PREFERRED EMBODIMENTS

Figure 1:
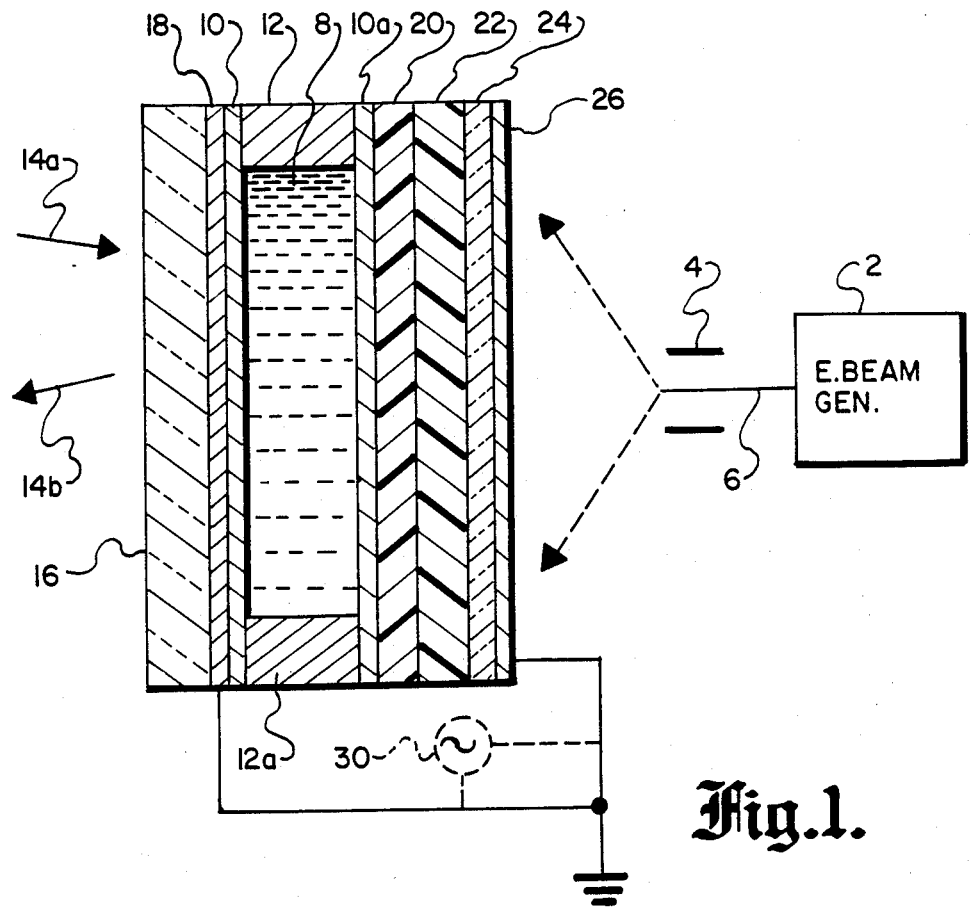
FIG. 1 is a sectional view of an electron beam addressed LCLV constructed in accordance with the present invention.

Referring to FIG. 1, a modified form of an LCLV is shown which provides a high resolution display of an electron beam scan pattern. A CRT is represented as an electron beam generator 2 and a pair of deflection plates 4 which cause the beam 6 to scan in a raster pattern. An additional pair of plates would also be provided to control the beam scan into and out of the page. The beam current is typically in the approximate range of 10 microamps to 1 milliamp.

The LCLV includes a layer of liquid crystal 8 which is enclosed in a cell formed by insulating films 10 and 10a on either side to provide electrical and chemical isolation, and spacers 12 and 12a which maintain a suitable gap between insulating films 10 and 10a and prevent liquid crystal 8 from escaping.

The left side of the LCLV is referred to as the "readout" side, since an optical readout beam 14a is directed onto the valve from this side and is reflected as an output beam 14b after it has been modulated in accordance with the electron beam pattern. A transparent cover plate 16, preferably made from glass, covers and protects the left hand side of the device. A transparent electrode 18, preferably formed from indium tin oxide, is located on the inner face of cover plate 16. This electrode provides a reference for the voltage established across the liquid crystal, as described below.

A mirror 20 is provided on the opposite side of the liquid crystal cell from the readout beam. This mirror receives the readout beam and reflects it back again through the liquid crystal. It can be implemented with a conventional wide band, high reflectivity dielectric mirror. This is in contrast to many light valves, which employ a photoconductive layer; this construction requires the mirror to have a limited bandwidth, since the mirror is required to absorb almost all of the readout light which is not reflected so as to avoid rendering the photoconductive layer conductive. The present light valve, however, does not employ a photoconductive layer, and therefore the mirror can be wide band. Instead of a dielectric mirror, a metal matrix mirro such as that disclosed in pending U.S. patent application Ser. No. 759,004, "Reflective Matrix Mirror Visible to Infrared Convertor Light Valve" by P. O. Braatz and assigned to Hughes Aircraft Company, the assignee of the present invention, may also be employed.

A support membrane 22 is positioned on the electron beam side of mirror 20, and supports both the mirror and a layer of partially conductive material 24. The membrane should be resistive so as to avoid shorting the partially conductive layer, with a high sheet resistivity in the order of $10^{12}$ohms/sq. or greater. It is either rigid, or stretchable so that it can be formed with a very flat surface plane; an outer ring (not shown) may be provided as a base for stretching the membrane. The membrane should be clear so as to not absorb light, which can cause it to heat up and become phsically distorted or transfer heat to a liquid crystal. Suitable membrane materials are Kapton, mica, $Al_2O_3$ and boron nitride. To protect it from possible electron damage, the membrane might incorporate a thin layer of $SiO_2$ or other resistive material evaporated onto its electron beam side.

A thin sheet of a conductive material 26 is formed on the electron beam face of the partially conductive layer, and preferably extends continuously across that layer. The conductive sheet is preferably deposited as a film by an evaporation process. It is kept quite thin, generally on the order of about 200–1,000 angstrons, so as to not present a substantial barrier to the electron beam. Most of the beam penetrates the conductive sheet and enters the partially conductive layer. Either a metal or a highly doped semiconductor can be used for the conductive sheet, but semiconductors do not have sufficient broadband reflectivity to also function as a mirror. Aluminum is preferred because it is easy to work with, fairly inert and a good broadband reflector. Other suitable metals include silver, chrome and nickel.

The conductive sheet 26 and the electrode 18 are connected together to ground or, in an alternate embodiment, an AC voltage source 30 may be connected between these elements as described below. The dimensions of the conductive sheet and the underlying partially conductive layer, and the conductivity of the partially conductive layer, are selected so that electrons absorbed within each pixel of the partially conductive layer during a particular scan will leak out to the conductive sheet by the time the electron beam has finished a scanning cycle and returned to that pixel. For a television scan rate of 3060 Hz, the leakage rate should be fast enough to dissipate the pixel in the approximately 17–30 milliseconds between scans. However, the dissipation through the partially conductive layer should be slow enough to permit the readout beam 14a to read the image before the image dissipates. The bulk resistivity of the partially conductive layer is preferably within the range of about $10^9$–$10^{11}$ ohm cm, and its thickness is preferably about 2–10 microns. Suitable partially conductive materials include silicon dioxide, amorphous silicon and cryolite; cadmium telluride may be acceptable in some applications, but for others it may be too conductive. For doped $SiO_2$, with a dielectric constant of about $4.5 \times 10^{-13}$, a resistivity of about $2 \times 10^{10}$ ohm cm will produce a charge dissipation time constant of about 10 millisec for a 30 millisec frame rate.

The partially conductive material can have a resistivity considerably greater than that used for the corresponding material in the related co-pending application Ser. No. 927,580. This is because the electrons in the beam which penetrate into the partially conductive material in general have a much longer distance to flow back out to the conductive grid in the related application. Whereas the electrons are generally implanted only about 1–2 microns into the partially conductive layer, the grid openings may be on the order of about 100 microns on each side. Thus, with the conductive sheet of the present invention the electrons have to flow back only about 1–2 microns to reach the sheet, whereas electrons which hit the partially conductive material in the middle of a grid opening have to flow about 50 microns laterally in addition to the 1–2 microns backward to reach the grid.

An adverse result of this phenomenon for the present invention is that the effect of the implanted electrons upon the liquid crystal is reduced for the same implant energy. This is because, if each layer of material is assumed to have parallel sides and a uniform dielectric constant, the effect on the liquid crystal of a particular electron implant will vary with the depth of implant beyond the back electrode 26, relative to the effective distance between the back and front electrodes 26 and 18. Since the average distance between the implanted electrons and the back electrode with a conductive grid is much greater than the average electron implant depth relative to a conductive sheet, the effect of the electron implant upon the liquid crystal will be correspondingly reduced when the back electrode is a conductive sheet 26. To compensate for this, either a higher electron implant voltage or current density is required with the present invention to compensate for the lower effective implant depth. In practice it is normally easier to increase both voltage and current density somewhat, rather than increasing only one or the other.

The electron charge absorbed into any particular pixel of the partially conductive layer 24 as a result of the electron beam scan produces a voltage across a corresponding location of the liquid crystal. Since the various elements of the light valve have a high resistance to lateral spreading, an essentially 1:1 correspondence can be achieved between the individual pixel areas of the partially conductive layer which receive electron charges, and corresponding areas of the liquid crystal which support a voltage determined by the absorbed charge. To avoid an excessive voltage drop across the membrane at the expense of the liquid crystal voltage, the membrane should be made quite thin, in the order of about 4–12 microns.

With a proper selection of the resistances and capacitances of the liquid crystal layer, the membrane and the partially conductive layer, the pixel voltages established across the liquid crystal from an electron beam scan can be made AC rather than DC. An AC operation is a distinct advantage, since liquid crystal tends to decompose under sustained DC operation. The liquid crystal polarization shift responds to the RMS voltage level, so that an AC voltage may be used to establish the polarization shift without the decomposition effects of DC operation.

The calculated input voltage 32 resulting from the electron beam scanning a particular pixel location, and the voltage 34 across the membrane, are shown in FIG. 2a, while the steady state voltage 36 across the liquid crystal after an initial transient period is shown in FIG. 2b. The beam scans the liquid crystal in a very short period of time, rapidly depositing electrons which produce voltage peaks 38 across the liquid crystal. The electron beam will typically deposit charge onto a pixel over a time period in the order of about 30 nsec. After the beam has passed, the electrons absorbed into the pixel will begin to flow back out to the right towards the conductive sheet 26, from whence they are dissipated to ground. Alternately, AC power supply 30 can be used to bias the liquid crystal to a voltage near its threshold voltage, so as to improve its sensitivity. After the electron beam has passed a given pixel and a maximum voltage has been produced across the liquid crystal, the liquid crystal voltage gradually decays along line 40 back to its original value.

If appropriate design parameters are followed, the area under the negative portion of the liquid crystal voltage curve will generally be equal to the area under the positive portion of the curve, resulting in an AC liquid crystal voltage characteristic over the course of repeated beam scans. This avoids the deterioration problem associated with DC operation, discussed above. On the other hand, the voltage decay is slow enough so that the liquid crystal has enough time to respond and produce the desired image.

The decay of the liquid crystal voltage field is controlled by the membrane time constant $R_M C_M$, where $R_M$ and $C_M$ are respectively the resistance and capacitance of the membrane. As can be seen from FIGS. 2a and 2b, there is approximately a 4:1 division between the voltages across the membrane and the liquid crystal. This can require a beam current in the order of 30 microamps to obtain adequate liquid crystal modulation.

Figure 3:
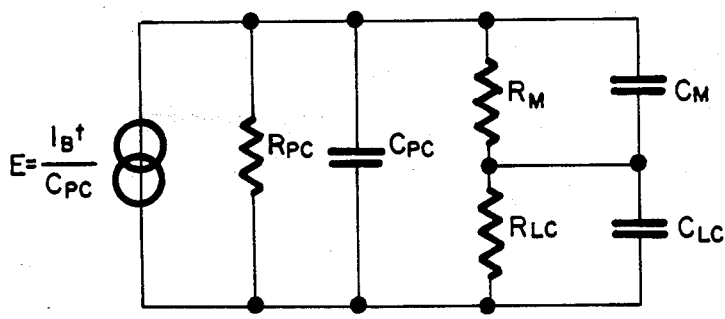
FIG. 3 is an equivalent circuit of the LCLV elements.

An equivalent circuit for the charge dissipation from the partially conductive layer is illustrated in FIG. 3. E represents the voltage resulting from the charge deposited in a particular pixel by the electron beam, $R_{PC}$ and $C_{PC}$ are respectively the resistance and capacitance of the partially conductive layer, $R_{LC}$ and $C_{LC}$ are respectively the resistance and capacitance of the liquid crystal, $I_B$ is the beam current and t is time, for one pixel element. The membrane and partially conductive layer capacitances are generally of the same order of magnitude, whereas the membrane sheet resistivity is generally much greater than that of the partially conductive layer. The charge deposited by the electron beam can flow out to the conductive sheet 26 either directly through the partially conductive layer, or through a parallel path consisting of the bulk of the membrance and liquid crystal to electrode 18. An AC voltage curve such as that shown in FIG. 2b will result from the following set of values, among others:

$R_{LC} = 6.2 \times 10^{12}$ ohms
$R_M = 1.1 \times 10^{17}$ ohms
$R_{PC} = 3.1 \times 10^{11}$ ohms
$C_{LC} = 7.8 \times 10^{-15}$ farads $C_M = 2 \times 10^{15}$ farads
$C_{PC} = 7.1 \times 10^{-15}$ farads
$I_{BEAM} = 10$ microamps
Pixel area $= 6.4 \times 10^{-6}$ cm$^2$ An important feature of this arrangement is that, beginning with a basically single polarity electron beam, an AC voltage is produced across the liquid crystal. Another advantage is the achievement of a very high resolution. With an electron beam diameter of 0.025 mm. and a 5 cm light valve, a 2,000 line system can be attained. The device has a very fast response time, being limited principally only by the liquid crystal. It also has a very simple structure that eliminates the need for fiber optics coupling plates or input imaging lenses used with prior devices. An image is produced with a high degree of uniformity, since each pixel of the partially conductive layer discharges directly into the adjacent conductive grid. It is also considerably more sensitive than the prior Tektronix or similar devices - since the present light valve is reflective rather than transmissive, the readout beam passes through the liquid crystal twice, both before and after reflection. This will permit a thinner liquid crystal layer to be used for the same sensitivity, or conversely will produce a greater sensitivity for the same liquid crystal thickness. Since the liquid crystal response time varies with the square of its thickness, any reduction in thickness will have a very positive effect upon responsivity.

In fabricating the device shown in FIG. 1, the mirror 20 is deposited onto the membrane 22 in one deposition run, and the partially conductive layer 24 is deposited onto the membrane in a separate deposition run. It would also be possible to reverse the positions of the membrane and mirror, so that the mirror is sandwiched between the membrane and partially conductive layer on the electron beam side of the membrane. This could enable the fabrication of these elements to be accomplished in a single deposition run. The membrane, however, would have to be transparent to permit passage of the readout light beam to the mirror.

Figure 4:
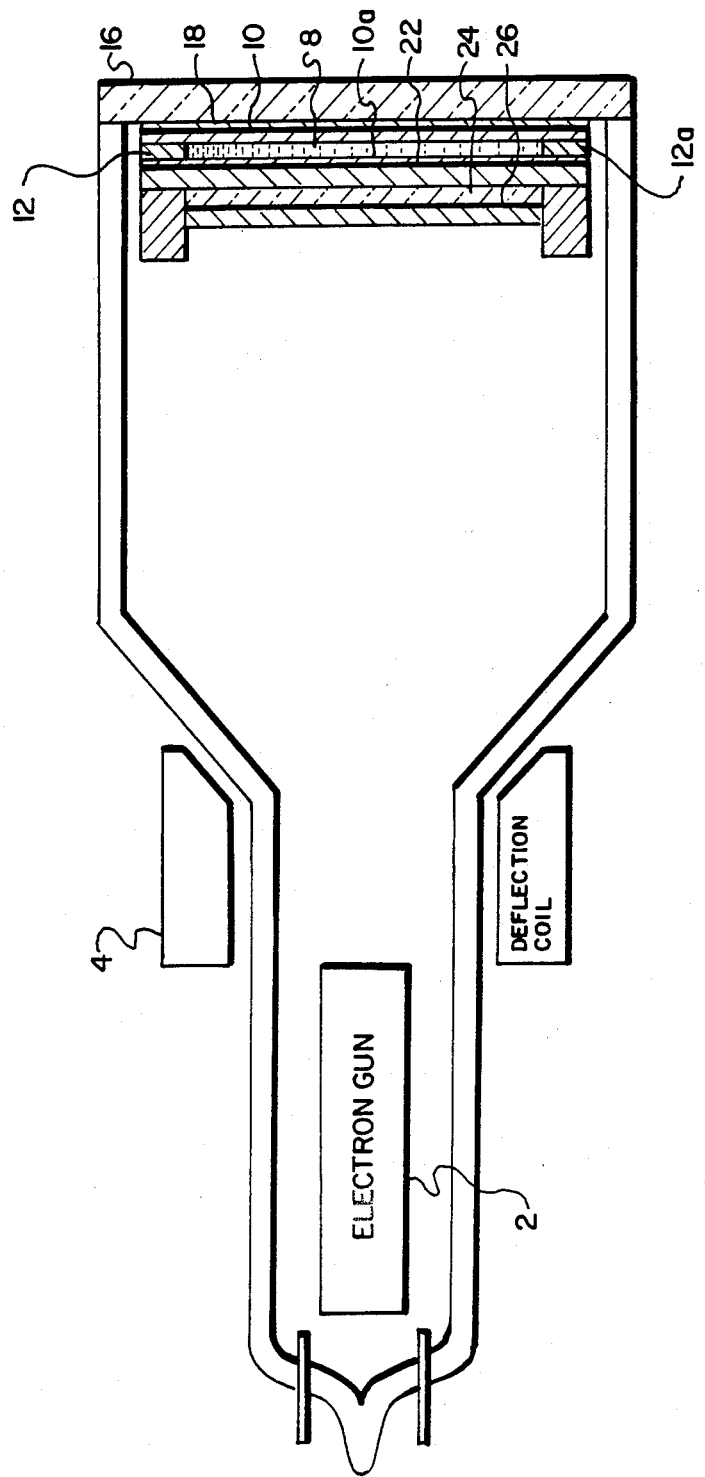
FIG. 4 is a sectional view of an alternate embodiment, showing further details of the electron beam generation apparatus.

Another variation of the basic invention is illustrated in FIG. 4. This figures shows the light valve integrated within a CRT. The light valve is similar to that shown in FIG. 1, and the same reference numerals are used for common elements. The principal difference is that, instead of a separate mirror, the conductive sheet 26 itself serves as the mirror. For this purpose it is preferably formed from aluminum about 500 angstroms thick. The membrane 22 should be generally transparent and non-birefringent in this application, as should the partially conductive layer 24. A readout beam is applied to the light valve from the right and penetrates all the way to the conductive sheet 26, where it is reflected back through the liquid crystal layer and out of the valve. Numerous other variations and alternate embodiments will also occur to those skilled in the art. Accordingly, it is intended that the invention be limited only in terms of the appended claims.

We claim:

1. A liquid crystal light valve (LCLV) addressable on one side by a scanning electron beam from a scanning electron beam generator, and on another side by a readout optical beam, comprising:
    a liquid crystal layer addressable by a readout optical beam,
    an electrically resistive membrane supported in proximity to the liquid crystal layer on the electron beam side thereof,
    a partially conductive layer of partially conductive material supported by the membrane and addressable by the electron beam, the accumulation, in the partially conductive material, of electric charge from the electron beam controlling the voltage across the liquid crystal,
    a conductive, electron beam permeable sheet on the electron beam side of the partially conductive layer, said conductive sheet for at least partially transmitting the scanning electron beam applied to the partially conductive layer, and for collecting charge received by the partially conductive layer as a result of electron beam scanning of the partially conductive layer, and
    circuit means connected to dissipate charge collected by said conductive sheet from the partially conductive layer.

2. The LCLV of claim 1, wherein the resistance of at least one of the LCLV layers is high enough to produce a substantially AC voltage across the liquid crystal following each electron beam scan.

3. The LCLV of claim 1, wherein the conductive sheet is substantially continuous across the partially conductive layer.

4. The LCLV of claim 1, wherein the conductive sheet comprises a metal.

5. The LCLV of claim 4, wherein the conductive sheet is formed from one of the group comprising aluminum, silver, chrome and nickel.

6. The LCLV of claim 1, wherein the conductive sheet is within the range of about 200 to about 1,000 angstroms thick.

7. The LCLV of claim 6, wherein the conductive sheet comprises a thin film evaporation on the partially conductive layer.

8. The LCLV of claim 1, wherein a transparent electrode is provided on the readout beam side of the liquid crystal layer, the electrode being connected to provide a voltage reference for the liquid crystal layer.

9. The LCLV of claim 8, the circuit means comprising a mutual connection between the conductive sheet and transparent electrode.

10. The LCLV of claim 9, wherein the conductive sheet and transparent electrode are grounded.

11. The LCLV of claim 9, the circuit means comprising an AC power supply connected between the conductive sheet and the transparent electrode.

12. The LCLV of claim 1, further comprising a mirror disposed on the electron beam side of the liquid crystal layer and adapted to reflect a readout beam received from the liquid crystal layer back through that layer.

13. The LCLV of claim 1, wherein the membrane is generally transparent and non-birefringent, and the conductive sheet is reflective on the readout beam side to reflect a received readout beam back through the liquid crystal layer.

14. The LCLV of claim 1, wherein the partially conductive layer has a bulk resistance in the order of about $10^9 - 10^{11}$ ohms per square.

15. A liquid crystal light valve (LCLV) addressable on one side by a scanning electron beam from a scanning electron beam generator, and on another side by a readout optical beam, comprising:
    a liquid crystal layer addressable by a readout optical beam,
    a partially conductive layer of partially conductive material supported in proximity to the liquid crystal layer on the electron beam side thereof to be addressed by the electron beam, the accumulation of electrons in the partially conductive layer from an electron beam scan, producing a voltage across the liquid crystal, a conductive, electron beam permeable sheet disposed on the electron beam side of the partially conductive layer and adapted to receive electron leakage therefrom, and circuit means connected to discharge the conductive sheet of electrons leaked from the partially conductive layer, the dimensions and materials for the various elements being selected, relative to the electron beam scanning rate, to produce an electron leakage rate from the partially conductive layer into the conductive sheet that is fast enough to substantially dissipate electrons delivered to the partially conductive layer during an electron beam scan prior to the next scan, but slow enough for the liquid crystal to produce an image for a readout beam.

16. The LCLV of claim 15, wherein the partially conductive layer has a bulk resistance in the order of about $10^9$–$10^{11}$ ohms cm.

17. The LCLV of claim 15, wherein the conductive sheet is substantially continuous across the partially conductive layer.

18. The LCLV of claim 15, wherein the conductive sheet comprises a metal.

19. The LCLV of claim 18, wherein the conductive sheet is formed from one of the group comprising aluminum, silver, chrome and nickel.

20. The LCLV of claim 15, wherein the conductive sheet is within the range of about 200 to about 1,000 angstroms thick.

21. The LCLV of claim 20, wherein the conductive sheet comprises a thin film evaporation on the partially conductive layer.

22. The LCLV of claim 15, wherein a transparent electrode is provided on the readout beam side of the liquid crystal layer, the electrode being connected to provide a voltage reference for the liquid crystal layer.

23. The LCLV of claim 22, the circuit means comprising a mutual connection between the conductive sheet and transparent electrode.

24. The LCLV of claim 23, wherein the conductive sheet and transparent electrode are grounded.

25. The LCLV of claim 23, the circuit means comprising an AC power supply connected between the conductive sheet and the transparent electrode.

26. The LCLV of claim 15, further comprising a mirror disposed on the electron beam side of the liquid crystal layer and adapted to reflect a readout beam received from the liquid crystal layer back through that layer.

27. The LCLV of claim 26, wherein the mirror is positioned between the liquid crystal layer and the membrane.

28. The LCLV of claim 15, wherein the membrane is generally transparent and non-birefringent, and the conductive sheet is reflective on the readout beam side to reflect a received readout beam back through the liquid crystal layer.

29. The LCLV of claim 15, wherein the membrane thickness is in the approximate range of 4–12 microns, the partially conductive layer thickness is in the approximate range of 2–6 microns, and the liquid crystal layer thickness is in the approximate range of 1–25 microns.

* * * * *